(12) United States Patent
Vecchiarelli et al.

(10) Patent No.: US 9,268,156 B1
(45) Date of Patent: Feb. 23, 2016

(54) SUNGLASSES AND METHOD OF FORMING THE SAME

(71) Applicant: EQO Optics, Colorado Springs, CO (US)

(72) Inventors: Ryan J. Vecchiarelli, Colorado Springs, CO (US); Jonathan D. Winfrey, Colorado Springs, CO (US)

( * ) Notice: Subject to any disclaimer, the term of this patent is extended or adjusted under 35 U.S.C. 154(b) by 0 days.

(21) Appl. No.: 14/167,617

(22) Filed: Jan. 29, 2014

Related U.S. Application Data

(60) Provisional application No. 61/758,761, filed on Jan. 30, 2013.

(51) Int. Cl.
*G02C 7/10* (2006.01)
*B23K 26/38* (2014.01)
*G02C 5/00* (2006.01)
*G02C 5/22* (2006.01)

(52) U.S. Cl.
CPC . *G02C 7/10* (2013.01); *B23K 26/38* (2013.01); *G02C 5/008* (2013.01); *G02C 5/22* (2013.01)

(58) Field of Classification Search
CPC .......... G02C 5/008; G02C 5/14; G02C 5/143; G02C 7/10; G02C 11/02; G02C 2200/12; G02C 2200/14; G02C 2200/16
USPC ............................ 351/41, 44, 51, 52, 83, 111
See application file for complete search history.

(56) References Cited

U.S. PATENT DOCUMENTS 5,537,161 A * 7/1996 Monroe .......................... 351/51
5,786,881 A * 7/1998 Monroe .......................... 351/51

* cited by examiner

*Primary Examiner* — Huy K Mai
(74) *Attorney, Agent, or Firm* — Scott J. Hawranek; Aspire IP

(57) ABSTRACT

The present invention generally relates to hand made sunglasses, and more particularly to a method and system for making sunglasses from recycled materials, e.g., skateboards.

20 Claims, 4 Drawing Sheets

SUNGLASSES AND METHOD OF FORMING THE SAME

Cross reference to related Application No. 61/758,761 filed Jan. 30, 2013, of which the above-identified provisional patent applications is being fully incorporated herein by reference.

BACKGROUND OF THE INVENTION

Field of the Invention

The present invention generally relates to hand made sunglasses, and more particularly to a method and system for making sunglasses from recycled materials, e.g., skateboards.

SUMMARY OF THE INVENTION

Accordingly, the invention is directed to sunglasses made from recycled materials and a method of forming the same that substantially obviates one or more of the problems due to limitations and disadvantages of the related art.

An advantage of the invention is to provide a use for used materials.

Another advantage of the invention is to provide a use for used skateboards. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus including a first sunglass, a second sunglass and a frame constructed from a one or more recycled substrate and the frame is configured to hold the first sunglass and second sunglass.

Yet another aspect of the invention is directed towards a method of forming sunglasses. The method includes providing a used or broken wooden skateboard, forming strips of predetermined dimensions from the skateboard, forming a frame configured to hold a first sunglass and second sunglass, forming a first arm and a second arm, and movably coupling the first arm and the second arm to the frame portion with a first and second hinge mechanism.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
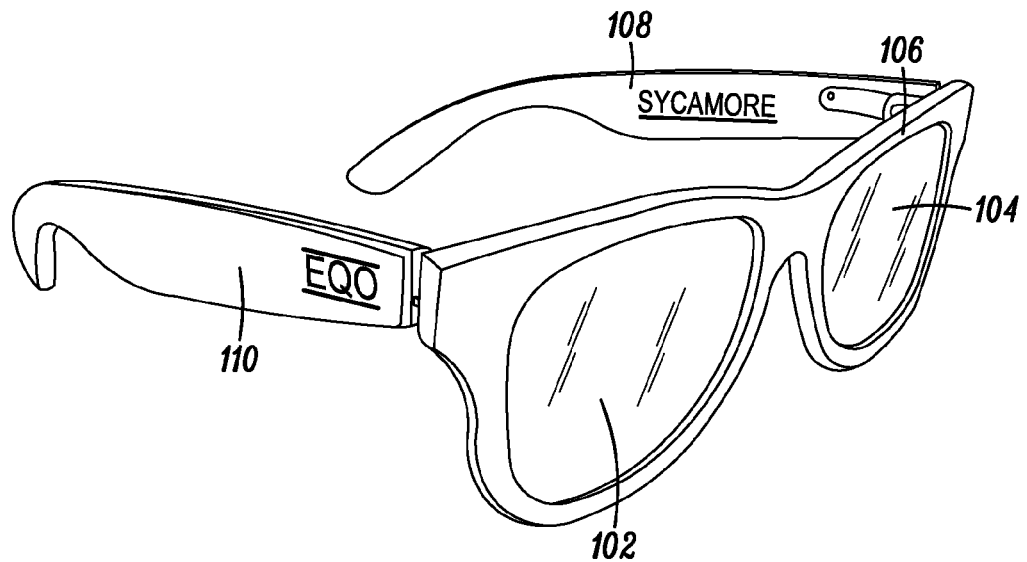
FIG. 1 illustrates a perspective view of sunglasses made from a recycled skateboard according to an embodiment of the invention.
Figure 2:
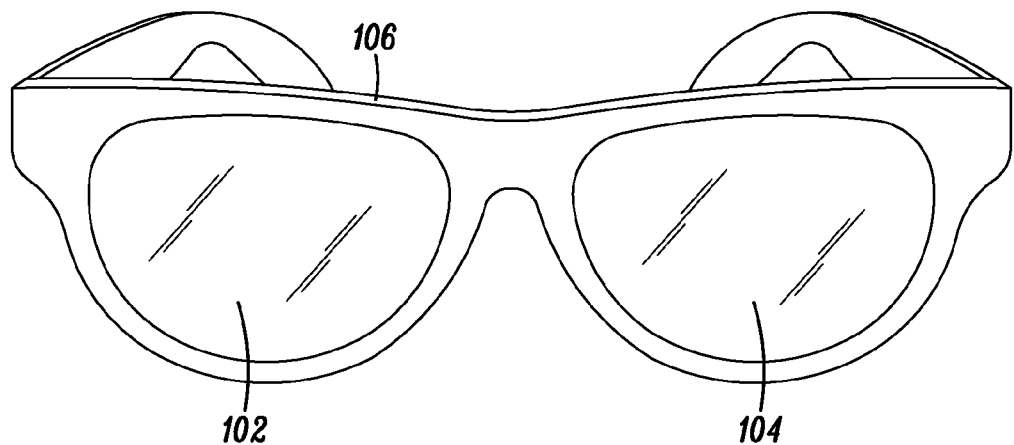
FIG. 2 illustrates a front view of the sunglasses in FIG. 1.
Figure 3:
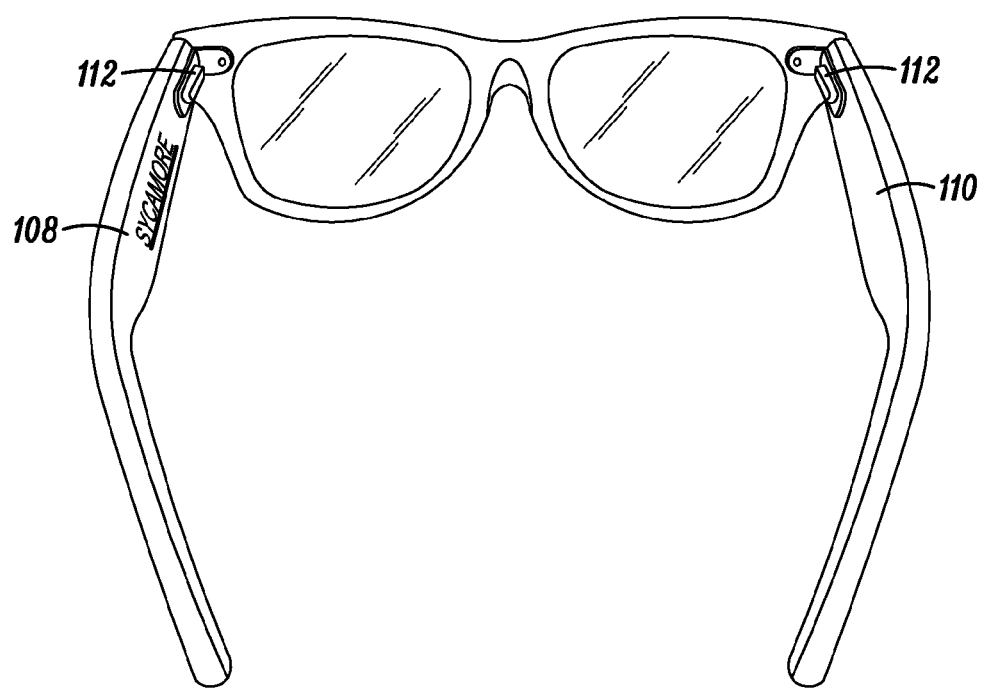
FIG. 3 illustrates a top rear view of the sunglasses of FIG. 1.
Figure 4:
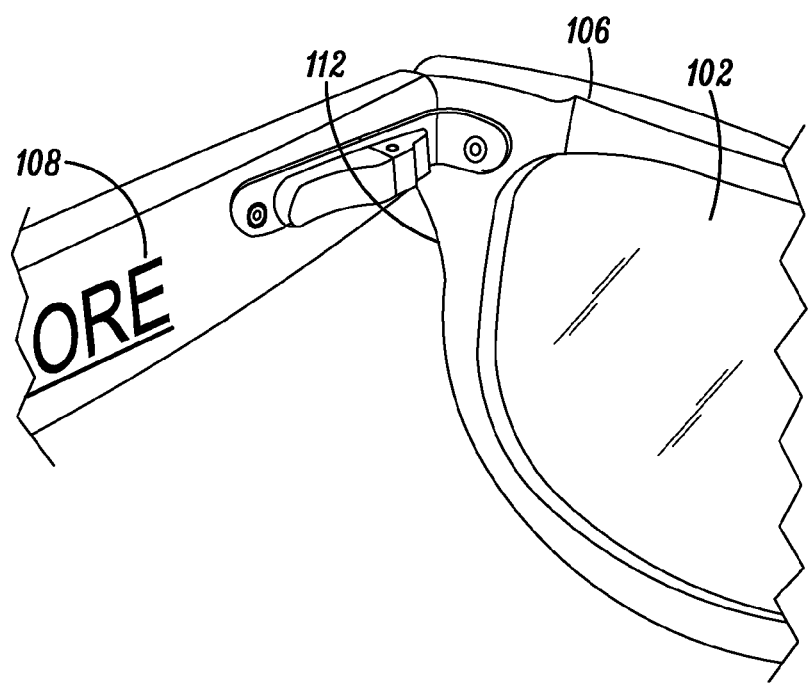
FIG. 4 illustrates an inside view of the hinge portion of the sunglasses in FIG. 1.
Figure 5:
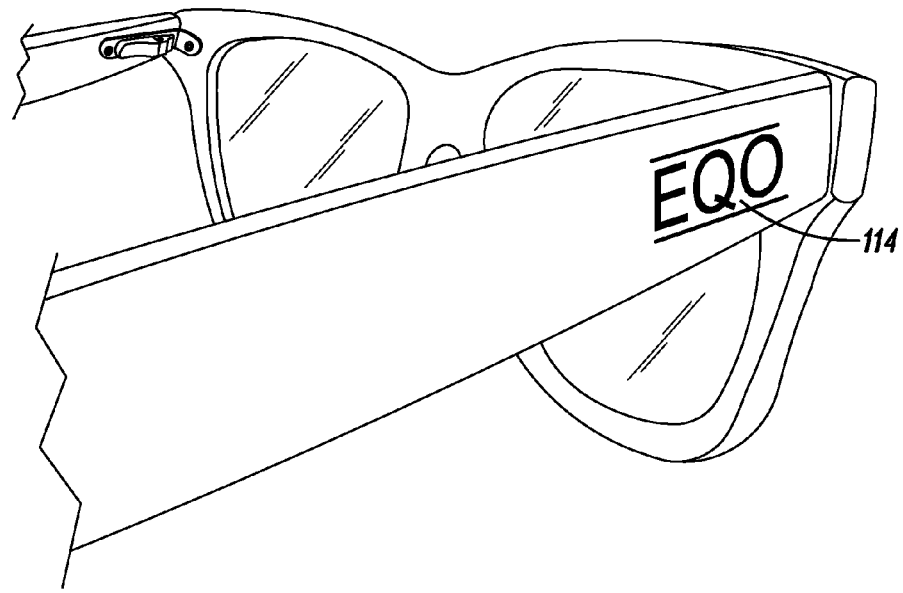
FIG. 5 illustrates a magnified right side inside view of the sunglasses in FIG. 1.
Figure 6:
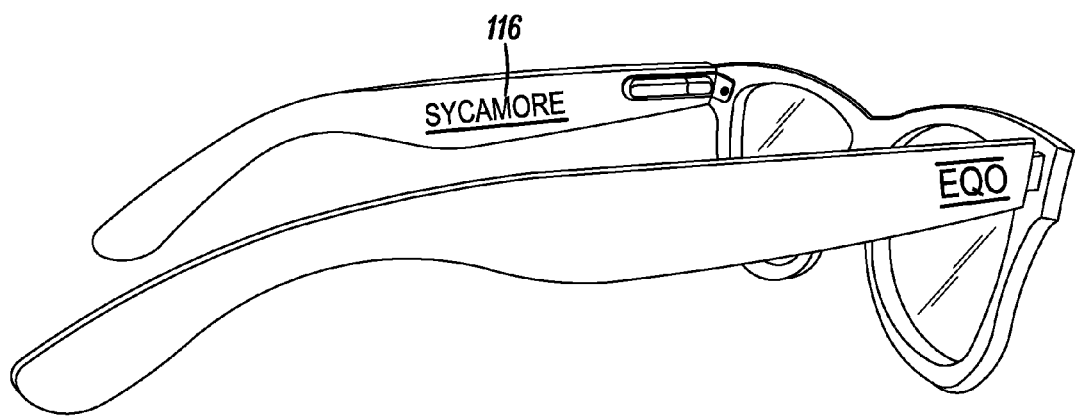
FIG. 6 illustrates a right side inside view of the sunglasses in FIG. 1.

FIG. 1 illustrates a perspective view of sunglasses made from a recycled skateboard according to an embodiment of the invention. FIG. 2 illustrates a front view of the sunglasses in FIG. 1. FIG. 3 illustrates a top rear view of the sunglasses of FIG. 1. FIG. 4 illustrates an inside view of the hinge portion of the sunglasses in FIG. 1. FIG. 5 illustrates a magnified right side inside view of the sunglasses in FIG. 1. FIG. 6 illustrates a right side inside view of the sunglasses in FIG. 1.

Referring to FIGS. 1-6, the sunglasses are generally depicted with reference to number 100. The sunglasses 100 include a first sunglass 102 and second sunglass 104 arranged in front portion 106. The front portion 106 is coupled to a first arm 108 and a second arm 110. The sunglasses are formed with recycled materials including one or more of used skateboards, snowboards, water or snow skis, surfboards, wakeboards, other water and snow sport implements or other recycled materials. The other recycled materials may include wood, plastics, composites, laminates and combinations of the same. In one embodiment, the recycled material includes one or more of wooden baseball bats, stadium seats, or other wooden or composite sport equipment including flooring, e.g., basketball flooring. The frame may be formed into any style include classic Wayfarer, wraparound or other styles. In a preferred embodiment, the recycled material includes 7-9 plies of Canadian-grown maple from recycled skateboards.

The first sunglass 102 and second sunglass 104 may include any optics such as optics that block 99 to 100 percent of both ultraviolet rays including UVA and UVB rays. Moreover, the lens may be Blue-blocking lenses generally tinted amber that can make distant objects easier to see, especially in low light; Polarized lenses; photochromic lenses that reduce glare and help maintain clarity, although they may take time to adjust to different light conditions; polycarbonate lenses that offer protection from impact injuries that may be sustained during physical activities; mirror-coated lenses that help block visible light and combinations of the same.

The frame 106 is movable coupled to the first arm 108 and the second arm 110 with a hinge mechanism 112. In a preferred embodiment, the hinge mechanism is a durable spring type hinge mechanism. Moreover, preferably a portion of the first arm 108 and the frame 106 is removed to allow at least a portion of the hinge to be flush with the wood. The sunglasses 100 are waterproof and can float, which is ideal for water sports.

In addition, the outside and/or inside portion of the first arm 108 and the second arm 110 may be customized with a laser etching, e.g., the name of the owner of the sunglasses, a logo, manufacturer's name, and the like. By way of example, a logo 114 is arranged and a logo 116 is provided. The sunglasses may be painted to be any color. Moreover, the sunglasses may be formed from one or more recycled skateboards and the color dependent on the inherent nature of the skateboard.

The following is a method for forming sun glasses from used, broken or new skateboard decks. It is noted that other substrates may also be used including any type of bamboo, snowboards, skis, wood, plastic, or laminated structure of one of the foregoing.

In one embodiment, the method of forming sunglasses from a recycled material includes: I. Deck Preparation, II. Frame Creation, III. Arm Creation, IV. Finishing, V. Assembly, VI. Materials and Equipment, and VII. Quality Assurance. The method is as follows:

I. Deck Preparation

First, donated recycled skateboards are received and categorized. Categorization may be in accordance to the following characteristics: color (e.g., middle ply, top/bottom ply), type (e.g., long board, shortboard, specialty), condition (e.g., whole, halved, destroyed). For decks determined to be unusable, they can be saved and recycled.

Second, grip tape is removed from a recycled skateboard determined to be usable. Using a heat gun, gently apply heat to grip tape, in a side-to-side fashion, in order to minimize burning. Peel off grip tape, starting from the nose, peeling down. The peeled grip tape may be placed in a "Grip Bin" for further recycling.

Figure 7A:
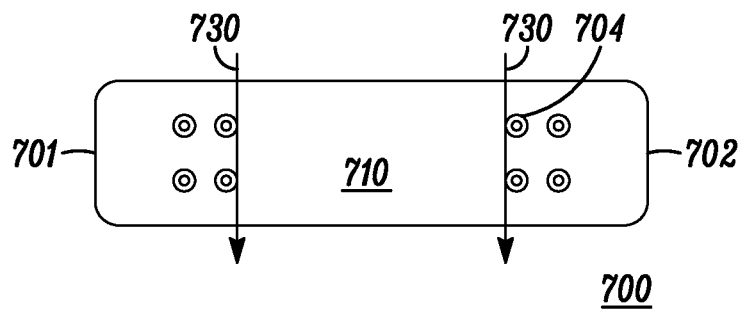
FIGS. 7A and 7B illustrate the cutting of a recycled skateboard in a method of forming sunglasses according to an embodiment.

Third, the nose and tail of the recycled skateboard are removed. Referring to FIG. 7A, skateboard 700 includes a tail 701, nose 702, body 710, and a number of bolt holes 704. Using a table saw, remove the tail 701 and nose 702 from the skateboard 700, cutting along the second line of bolt holes 704. The cuts 730 are as shown in FIG. 7A. The tail 701 and nose 702 are placed and organized in the "Tail Bin" according to color and condition. The body 710 is placed in the "Body Bin."

Figure 7B:
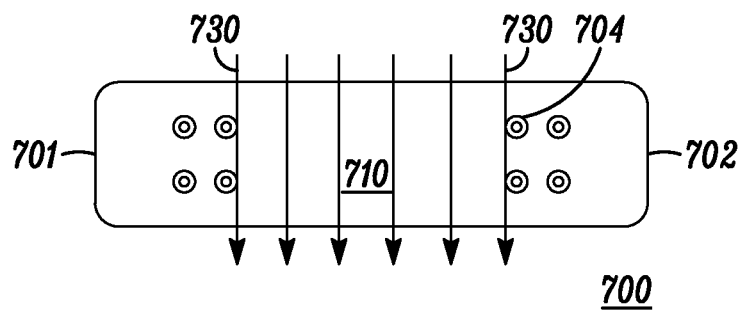

Referring to FIG. 7B, using the table saw, body 710 is further ripped into individual 2½ inch strips by cuts 730. The strips are organized in the "Strip Bin" according to color and condition.

II. Frame Creation

First, frames are laser cut and surfaced. In this process, frame strips are placed horizontally onto a laser table and aligned squarely with the laser head. The laser head is aligned with the dead center of the frame strip. Frame programs always originate from the exact center of the design. Appropriate z-axis spacing is set using a provided alignment block. An ordered frame design is loaded into the LaserCut software. One should assure that the laser power/speed/origin have not been altered. The ordered frame design is transferred to the laser using the "Download" and "Download Current" command buttons, respective. One should confirm that the strip is aligned and secured properly, and then close the laser lid. Using the "Test Box" command button, one should ensure that the frame strip is of correct size for the application and that the laser head is aligned properly. The laser process is started by pressing the "Start" button on the front of the laser. The laser lid should not be opened until the laser has stopped moving; one should also not watch the laser. Once the audible "Complete Beep" is heard, the laser lid is opened to remove the strip, frame, and lens-hole cutouts. The frame is placed in the "Pre-Sand Frames Bin," the lens-hold cutouts is placed in the "Raw Biscuit Bin," and the strip skeleton is placed in the "Recycle Bin."

Second, the laser-cut frames are sanded. Using a belt sander (4"×36", 120 grit), the face of the frame is sanded down to 4-plies, counting the plies from the back to face of the frame. Using a belt sander (1"×24", 120 grit), the charring due to laser residue from the laser cut process is sanded off from the edges of the frame, using a 90 degree saning angle. Using a Dremel sanding drum tool (120 grit), the charring is removed from the inner nose bridge of the frame while simultaneously impressing a cosmetic "Nose Bridge Gap" on the back of the frame. Using a random orbit sander (120 grit), the charring is removed from the back of the frame; one should be careful to not distort the nose pads or hinge housings. Using a mouse sander (120 grit), a 45 degree fillet is imposed to each exposed edge of the frame, face and back. Using the Dremel router bit and guide, a "lens trench" is carefully routed out for each lens hold. The frame is further prepared for finishing by removing excess dust with the air-chuck or damp towel.

III. Arm Creation

First, the arm is laser cut and surfaced. The nose/tail are placed onto the laser bed with the bolt holes facing away from the operator and toward the back of the laser. The nose/tail is fit snugly to the back of the laser, using extra support under the curve if necessary. The appropriate z-axis spacing is set using the provided alignment block. The ordered arm design is loaded into the LaserCut software. One should assure that the laser power/speed/origin has not been altered. The order frame design is transferred to the laser using the "Download" and "Download Current" command buttons, respectively. The origin of the laser head is set to the middle of the top bolt holes (i.e., holes furthest from the operator); this ensures that same arm output in repeated operations. One should confirm the nose/tail is aligned and secured properly, and then close the lid. Using the "Test Box" command button, one should ensure that the frame strip is of correct size for the application and that the laser head is aligned properly. The laser process is started by pressing the "Start" button on the front of the laser. The laser lid should not be opened until the laser has stopped moving; one should also not watch the laser. Once the audible "Complete Beep" is heard, the laser lid is opened to remove the nose/tail and the completed sets of arms. One should be careful to not confuse the corresponding left and right arms. The corresponding left and right arms are taped together into pairs and placed in the "Pre-Engrave Arms Bin." The nose/tail skeleton is placed in the "Recycle Bin."

Second, the laser-cut sets of arms are sanded. Using a belt sander (4"×36", 120 grit), the face of the arms are sanded down to 3-3.2 plies, counting the plies from the back to the face of the arms. Ply count depends on the style/color ordered. Using the belt sander (4"×36", 120 grit), the arms are shaped, removing any charring that has incurred during the laser process. The arms are now ready for branding.

Third, the arms are laser branded. The arms are placed horizontally onto the laser bed and secured with the provided table clamps. The appropriate z-axis spacing is set using the provided alignment block. The ordered logo/branding is loaded into the LaserCut software. One should assure that the laser power/speed/origin has not been altered. The ordered frame design is transferred to the laser using the "Download" and "Download Current" command buttons, respectively. Using the "Test Box" command button, one should ensure that the frame strip is of correct size for the application and that the laser head is aligned properly. The laser process is started by pressing the "Start" button on the front of the laser. The laser lid should not be opened until the laser has stopped moving; one should also not watch the laser. Once the audible "Complete Beep" is heard, the laser lid is opened to remove the arm; the quality and position of the logo/branding is checked. The previous steps are repeated for each arm and logo/branding. Upon completion, the arms (re-taped) are placed into the "Post-Engrave Bin."

Fourth, the laser branded arms are further sanded. Using the mouse sander (120 grit), any charring created during the logo branding process is lightly removed. Using the mouse sander (120 grit), the 45 degree fillet is imposed to each exposed edge of the arm, including face and back but excluding the two edges that meet the frame. The arms are further prepared for finishing by removing excess dust with the air-chuck or damp towel.

IV. Finishing

The ordered and prepped frames/arms are securely mounted to the spraying rack. Enamel and spray equipment are prepared (if applicable). Holding the spray gun 8-10 inches away from the frames/arms to be finished, a single light coat is sprayed on all surfaces of the frames/arms, overlapping each pass to ensure proper coverage. The sprayed frames/arms are let dry for a minimum of 20 minutes. A second coat is applied in the same manner as the first. The frames/arms are further let dry for a minimum of 20 minutes. The frames/arms are removed from the rack. Each surface of the frames/arms are wet-sanded thoroughly with 2000 grit websand paper. The wet-sanded frames/arms are rinsed with clean water, wiped and let dry for 10 minutes. The web-sanded frames/arms are re-mounted to the spraying rack. A third and final coat is applied in the same manner as the first and second coats. All third-coated pieces are dried for at least 1 hour before handling. Once dried, the corresponding frames and arms are tapped together and placed into the "Assembly Bin."

V. Assembly

The right and left hinges are mounted to the corresponding arm using the provided Slo-Jet glue and hinge-screw. One should be careful to check the angle on the hinge to assure hinge location. The pieces are clamped and let dry for 20 minutes. The hinged arms are unclamped and mounted to the corresponding frame using the provided Slo-Jet glue and hinge-screw. One should ensure evenly spaced arm angles (place pair, arms open, flat on a level surface). The glued assembly is set aside for final drying for 1 hour. Once drying is completed and each pair has been flex-tested for durability, the right and left lens may be fitted by hand, ensuring proper seating into the lens trench. The entire pair is cleaned completely thoroughly with the provided cleaning wipes. The pair is set aside for packaging and shipping.

VI. Required Materials and Equipment

The following lists the required materials and equipment needed for the method according to an embodiment:

laser cutter/engraver (Full Spectrum Laser or comparable, 80 watt minimum, and 500 inches×300 inches bed size minimum); desktop or laptop computer (for operation of the laser); table saw; band saw; belt sander (4"×36", 120 grit sanding belt); belt sander (1"×24", 120 grit sanding belts); Dremel cutting tool (drum sander bit, large & small, 120 grit sleeves, and small, spherical engraving bit w/router attachment); random orbit sander (4 inch or smaller, 120 grit sanding pads); mouse sander (120 grit sanding pads); air compressor with air chuck; "Spraying Rack" (can be designed and constructed in-shop, must hold 30 frames and 30 pairs of arms); paint spraying equipment (gun and hose and mineral spirits for cleaning after use); micro screwdriver set (philips, 2×); small pinch-clamps (60×); polarized lenses provided by Poloroid; and spring hinges and screws provided by Tai Li Glasses Parts, China.

VII. Quality Assurance Checklist

This following steps are optionally performed to ensure quality of each of the sunglasses:

Check that each pair is free from scratches or inconsistencies in finish. Each pair, placed on a flat surface with arms extended, is flush on all contacting surfaces. Each pair is clearly & cleanly branded with the appropriate client branding. Each pair has fully functioning hinges (no sticking, arms open & close fully, springs are operating properly.) Each lens is properly seated into the Lens Trench, with no distortion in the natural lens curve. Each arm meets the frame at the designated angle and distance. Each retaining screw is fully inserted into their respective positions. Each pair (frame and arms) is of the designated ply thickness. Each order is of the correct styling, size, color, and quantity dictated by the order.

The inventions and methods described herein can be viewed as a whole, or as a number of separate inventions that can be used independently or mixed and matched as desired. All inventions, steps, processes, devices, and methods described herein can be mixed and matched as desired. All previously described features, functions, or inventions described herein or by reference may be mixed and matched as desired.

It will be apparent to those skilled in the art that various modifications and variations can be made in the present invention without departing from the spirit or scope of the invention. Thus, it is intended that the present invention cover all of the modifications and variations of this invention provided they come within the scope of the appended claims and their equivalents.

What is claimed is:

1. An apparatus, comprising:
    a first sunglass;
    a second sunglass; and
    a frame comprising a recycled substrate configured to hold the first sunglass and second sunglass.

2. The apparatus of claim 1, wherein the recycled substrate comprises a material including one of skis, snowboard, skateboard deck, and scooter deck.

3. The apparatus of claim 1, wherein the recycled substrate comprises a material including one of wood, plastic, and laminate.

4. The apparatus of claim 1, wherein the frame comprises a face portion movably coupled to a first arm and a second arm.

5. The apparatus of claim 4, wherein the face portion is movably coupled to a first arm and a second arm with a spring hinge.

6. The apparatus of claim 1, wherein the first sunglass and second sunglass comprise optics configured to substantially block ultraviolet rays.

7. The apparatus of claim 1, wherein the first sunglass and second sunglass comprise polarized optics.

8. The apparatus of claim 1, wherein the first sunglass and second sunglass comprise one of a glass material or plastic material.

9. The apparatus of claim 1, wherein the apparatus is waterproof.

10. The apparatus of claim 1, wherein the apparatus comprises more than one recycled skateboard.

11. A method of forming sunglasses, comprising the steps of:
    providing a used or broken wooden skateboard;
    forming strips of predetermined dimensions from the skateboard;
    forming a frame configured to hold a first sunglass and second sunglass;
    forming a first arm and a second arm; and
    movably coupling the first arm and the second arm to a portion of the frame with a first and second hinge mechanism.

12. The method of claim 11, wherein the forming frame step comprises laser cutting.

13. The method of claim 11, wherein the forming the first arm and second arm step comprises laser cutting.

14. The method of claim 11, further comprising the step of laser branding or engraving a predetermined logo or text into one of the first arm, second arm and frame.

15. The method of claim 11, further comprising the step of dry sanding one of the first arm, second arm and frame.

16. The method of claim 11, further comprising the step of wet sanding one of the first arm, second arm and frame.

17. The method of claim 11, further comprising the step of inserting a first sunglass and second sunglass into the frame.

18. The method of claim 11, further comprising the step of painting one or more of the first arm, the second arm and the frame.

19. A method of forming sunglasses, comprising the steps of:
- providing a used or broken substrate material;
- forming strips of predetermined dimensions from the used or broken substrate material;
- forming a frame configured to hold a first sunglass and second sunglass;
- forming a first arm and a second arm; and
- movably coupling the first arm and the second arm to the frame portion with a first and second hinge mechanism.

20. The method of claim 19, wherein the used or broken substrate material comprises a snowboard, a water ski, and a snow ski.

\* \* \* \* \*